United States Patent
Sharan et al.

(10) Patent No.: US 11,639,673 B2
(45) Date of Patent: May 2, 2023

(54) COMPOSITE ENGINE OIL PAN AND METHOD OF MAKING

(71) Applicant: Deere & Company, Moline, IL (US)

(72) Inventors: Apurva Sharan, Nagpur (IN); Sanjeev M. Hallale, Pune (IN); James E. Hostetler, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 65 days.

(21) Appl. No.: 16/996,026

(22) Filed: Aug. 18, 2020

(65) Prior Publication Data
US 2022/0056822 A1  Feb. 24, 2022

(51) Int. Cl.
*F01M 11/00* (2006.01)
*B29C 70/34* (2006.01)
(Continued)

(52) U.S. Cl.
CPC ......... *F01M 11/0004* (2013.01); *B21D 22/02* (2013.01); *B29C 70/06* (2013.01); *B29C 70/305* (2013.01); *B29C 70/34* (2013.01); *B29C 70/545* (2013.01); *B29C 70/682* (2013.01); *B29C 70/683* (2013.01); *B29C 70/78* (2013.01); *B32B 1/02* (2013.01); *B32B 7/02* (2013.01); *B32B 15/08* (2013.01); *B32B 27/06* (2013.01);
(Continued)

(58) Field of Classification Search
CPC ......... F01M 11/0004; F01M 2011/002; F01M 2011/0054; F01M 2011/0066; F01M 2011/0091; F01M 11/04; F01N 1/24; B21D 22/02; B29C 70/06; B29C 70/305; B29C 70/34; B29C 70/545
See application file for complete search history.

(56) References Cited

U.S. PATENT DOCUMENTS 4,432,433 A * 2/1984 Ogawa ............... F02B 77/13
                                                    181/204
6,234,136 B1 * 5/2001 Choi .................. F01M 11/0004
                                                    123/195 C
(Continued)

FOREIGN PATENT DOCUMENTS

CN  102585455 A   7/2012
CN  103363562 A   10/2013
(Continued)

*Primary Examiner* — Syed O Hasan
(74) *Attorney, Agent, or Firm* — Klintworth & Rozenblat IP LLP (57) ABSTRACT

A composite oil pan for a work vehicle engine and a method of forming the composite engine oil pan include forming a sheet of metal into a first pan and open molding a fiber-reinforced polymer resin onto the first pan forming a second pan. The first pan has a first bottom wall and first peripheral walls extending from edges of the first bottom wall to define a sump, the first peripheral walls terminating in a first peripheral flange. The second pan has a second bottom wall and second peripheral walls abutting the first bottom wall and the first peripheral walls, the second peripheral walls terminating in a second peripheral flange. The first pan defines a thin metal structure with an inner surface extending across the first bottom wall, first peripheral walls and first peripheral flange; the second pan reinforces the first pan without abutting the inner surface.

17 Claims, 5 Drawing Sheets

(51) Int. Cl.

| | | |
|---|---|---|
| B29C 70/30 | (2006.01) | |
| B29C 70/54 | (2006.01) | |
| F01M 11/04 | (2006.01) | |
| B32B 15/08 | (2006.01) | |
| B32B 1/02 | (2006.01) | |
| B29C 70/68 | (2006.01) | |
| B29C 70/06 | (2006.01) | |
| B32B 7/02 | (2019.01) | |
| B32B 27/06 | (2006.01) | |
| B32B 27/18 | (2006.01) | |
| B32B 27/32 | (2006.01) | |
| B32B 27/34 | (2006.01) | |
| B32B 27/38 | (2006.01) | |
| B32B 37/10 | (2006.01) | |
| B32B 37/14 | (2006.01) | |
| B32B 37/24 | (2006.01) | |
| B21D 22/02 | (2006.01) | |
| B29C 70/78 | (2006.01) | |
| B29K 77/00 | (2006.01) | |
| B29K 33/04 | (2006.01) | |
| B29K 63/00 | (2006.01) | |
| B29L 31/30 | (2006.01) | |
| B29K 309/08 | (2006.01) | |
| B29K 705/00 | (2006.01) | |

(52) U.S. Cl.
CPC .............. *B32B 27/18* (2013.01); *B32B 27/32* (2013.01); *B32B 27/34* (2013.01); *B32B 27/38* (2013.01); *B32B 37/10* (2013.01); *B32B 37/144* (2013.01); *B32B 37/24* (2013.01); *F01M 11/04* (2013.01); *B29K 2033/04* (2013.01); *B29K 2063/00* (2013.01); *B29K 2077/00* (2013.01); *B29K 2309/08* (2013.01); *B29K 2705/00* (2013.01); *B29L 2031/30* (2013.01); *B32B 2250/02* (2013.01); *B32B 2262/101* (2013.01); *B32B 2305/22* (2013.01); *B32B 2307/70* (2013.01); *B32B 2311/00* (2013.01); *B32B 2333/04* (2013.01); *B32B 2363/00* (2013.01); *B32B 2377/00* (2013.01); *B32B 2605/00* (2013.01); *F01M 2011/002* (2013.01); *F01M 2011/0054* (2013.01); *F01M 2011/0066* (2013.01); *F01M 2011/0091* (2013.01)

(56) References Cited

U.S. PATENT DOCUMENTS

| | | | |
|---|---|---|---|
| 6,584,950 | B1 * | 7/2003 | Cunningham ..... F01M 11/0004 123/195 C |
| 2016/0023389 | A1 | 1/2016 | Griebel et al. |
| 2018/0030924 | A1 * | 2/2018 | Coppola ............... B29C 66/721 |
| 2019/0368154 | A1 * | 12/2019 | Nunnery ................... C08K 3/08 |

FOREIGN PATENT DOCUMENTS

| | | |
|---|---|---|
| DE | 10302191 A1 | 8/2004 |
| JP | 2019127901 * | 1/2019 |
| WO | 2007137830 A1 | 12/2007 |

* cited by examiner

COMPOSITE ENGINE OIL PAN AND METHOD OF MAKING

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates to an engine oil pan for work vehicles and method of forming the engine oil pan.

BACKGROUND OF THE DISCLOSURE

Various work vehicles used in the agriculture, construction, and forestry industries may have oil pans for collecting used engine oil to be subsequently recirculated. In designing and manufacturing engine oil pans require suitable strength, impact resistance, and performance while minimizing costs even for low volume production runs.

SUMMARY OF THE DISCLOSURE

The disclosure provides a layered composite engine oil pan for a work vehicle and method of forming the same.

In one aspect, the disclosure provides a method of forming a composite oil pan for an engine of a work vehicle. The method includes forming a sheet of metal into a first pan and open-molding a fiber-reinforced polymer resin onto the first pan. In the forming step, the first pan has a first bottom wall and first peripheral walls extending from edges of the first bottom wall to define a sump for containing engine oil, the first peripheral walls terminating in a first peripheral flange extending outwardly. In the open-molding step, the fiber-reinforced polymer resin forms a second pan having a second bottom wall in abutting relation with the first bottom wall and having second peripheral walls extending from edges of the second bottom wall and in abutting relation with the first peripheral walls, the second peripheral walls terminating in a second peripheral flange in abutting relation with the first peripheral flange. The first pan defines a thin wall metal structure with an inner surface extending across the first bottom wall, the first peripheral walls and the peripheral first flange, and wherein the second pan reinforces the first pan without abutting the inner surface.

In another aspect, the disclosure provides a composite engine oil pan. The composite engine oil pan includes a first pan and a second pan. The first pan is formed of a sheet of metal with a first bottom wall and a first plurality of peripheral walls extending generally upwardly from the first bottom wall, the first plurality of peripheral walls including a first front wall, a first rear wall, and first side walls, the first plurality of peripheral walls terminating in a first peripheral flange extending outwardly from a top of one or more of the first front wall, the first rear wall, and the first side walls, the first pan including: an oil sump for containing oil defined by an inner surface extending contiguously along the first bottom wall and the first plurality of peripheral walls and an outer surface opposite the inner surface. The second pan is formed of a fiber-reinforced polymer resin with a second bottom wall and a second plurality of peripheral walls extending generally upwardly from the second bottom wall, the second plurality of peripheral walls including a second front wall, a second rear wall, and second side walls, the second plurality of peripheral walls terminating in a second peripheral flange extending outwardly from a top of one or more of the second front wall, the second rear wall, and the second side walls, the second pan abutting and bonded to the outer surface of the first pan. The second pan is mounted to cover, at least in part, the outer surface of the first pan. The second pan is thicker than the first pan to structurally reinforce the first pan without abutting the inner surface of the first pan.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed engine oil pan, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction and orientation, such as "downstream," "upstream," "longitudinal," "radial," "axial," "circumferential," "lateral," and "transverse" may be used. Such terms are defined, at least in part, with respect to a wheel axle, engine components, and/or suspension components. As used herein, the term "longitudinal" indicates an orientation along the length of the apparatus; the term "lateral" indicates an orientation along a width of the apparatus and orthogonal to the longitudinal orientation; and the term "transverse" indicates an orientation along the height of the apparatus and orthogonal to the longitudinal and lateral orientations. These orientations may be taken in relation to a work vehicle, or a travel direction of the work vehicle, to which the components may be attached. As used herein, the terms "front," "forward," "rear," and "rearward" are merely example relative terms with respect to a primary direction of travel of a depicted configuration of a work vehicle. In other examples, the components referenced by those terms may be reversed in accordance with the present disclosure.

OVERVIEW

Work vehicles, such as agricultural combines or harvesters, typically include an oil pan below an engine for collecting engine oil for subsequent filtering and recirculation. During use, the engine oil pan may be exposed to external forces including heat, vibration, impact loads (for example from rocks and other debris), and compression loads from bolts or other mounting devices. The engine oil pan also experiences internal factors such as leakage in cracks and joints, seepage of oil from the sump into the pan material itself and the like. Accordingly, engine oil pans must satisfy a wide variety of design and performance requirements. As described below, this disclosure provides a layered composite engine oil pan and method of forming the engine oil pan that is capable of accommodating such forces while maintaining the integrity of the pan and volume of the oil.

Generally, it may be beneficial for work vehicles, such as agricultural combines, to be designed for specific tasks or work environments. Certain work vehicles or their engines are designed for specialized uses (e.g., certain sizes or jobs for agricultural combines) and may only be manufactured in small quantities or by direct order. In this situation, production costs for the work vehicle, engine, or components thereof (e.g., an oil pan for the engine) cannot be spread out among a large number of units as is the case for more common work vehicles and generic components. Moreover, a dedicated assembly line and tooling may not be desired for these specialized components because production is only intermittent. As a result, manufacturers are disincentivized from producing components that are specially adapted to particular applications due to the high costs per unit of manufacturing, preparation and tooling An ongoing demand thus exists for the provision of an engine oil pan having robust performance including improved oil retention that is tailored to small production uses while maintaining low manufacturing costs and ease of assembly. As described below, embodiments of the disclosed engine oil pan function to optimize performance while being advantageously designed for small production runs. Generally, this disclosure provides a composite engine oil pan and a method for forming the composite engine oil pan for use in a work vehicle. The composite engine oil pan is non-structural with reference to bearing loads on the vehicle frame but requires suitable strength and impact resistance for use in heavy duty work vehicles during adverse conditions (e.g., vibration, heat, long run times, highway speeds, impact from large debris, and the like).

The disclosure pertains to an oil pan for an engine of a work vehicle formed from a multi-layer hybrid or composite structure. A first inner layer is formed from relatively thin metal and functions as an oil sump, providing liquid impermeable surface and wear resistance. A second outer layer is formed from an open-molded polymer and functions to provide structural strength, impact resistance and sound dampening. The outer layer may be an oleophilic material. The outer layer abuts an outer surface of the inner layer. Compression limiters may be provided in a mounting flange to accommodate bolt clamping loads. The arrangement of both layers and the related assembly process provide a lightweight non-structural oil pan with low manufacture costs (including material costs and tooling costs).

In certain embodiments, the disclosure provides a composite engine oil pan that has two layers provided as a first pan and a second pan. Each layer may be a fully-formed pan in the shape of the composite engine oil pan. The first and second pans each provide individual functions and benefits for the use of the composite engine oil pan. The first pan forms an oil sump at an inner surface. The first pan is formed of a metal material (e.g., aluminum, aluminum alloys, other ductile metals, and the like) that is advantageous for retaining oil with minimal or no leakage. The metal material of the first pan is relatively thin to provide a low weight and small form. The second pan is formed of a polymeric material (e.g., a fiber-reinforced polymer, other fiberglass, and the like) that is advantageous for providing structural strength (e.g., rigidity), low weight, isolation of noises and vibrations, and preventing or reducing puncture damage (e.g., from rocks and other debris in a field or on a road). The second pan does not abut the inner surface of the second pan and therefore does not contact oil, allowing for polymeric materials that otherwise would not be used for retaining oil, such as oleophilic materials. The second pan is advantageous for preventing impact damage to the first pan and the composite engine oil pan in general.

In another aspect, the disclosed arrangement of a composite engine oil pan formed of two layered pans collectively provides benefits over conventional oil pans and the individual layers alone. The composite engine oil pan provides a continuous inner surface defining the oil sump and therefore does not have any joints or discontinuities that can form leak points or seams. The selection and arrangement of thin metal and polymeric material result in an oil pan having low weight, low material costs, low manufacturing costs, and minimal tooling costs even despite small production runs.

In still another aspect, the composite engine oil pan provides a reinforced mounting flange for rigid attachment to an engine block. The mounting flange may experience significant stresses when mounted to an engine block due to compression from a mounting bolt and/or other factors (e.g., work vehicle movement, loads on the vehicle frame, and the like). The compression and other forces may overcome the mechanical strength of the thin metal and polymeric material that constitute the composite engine oil pan. Accordingly, the mounting flange is provided with compression limiters of greater compressive strength to reinforce bolt openings of the flange.

The disclosure also provides a composite two-layer arrangement of an oil pan that is advantageous for particular non-structural applications in work vehicles. Such oil pan arrangements may be readily produced in low quantities with low tooling costs. The composite engine oil pan is formed onto a mold form that may be wood or other low-cost material that is readily designed and fabricated. Both of the oil pan layers (i.e., a first pan of metal and second pan of polymeric material) may be formed with hand tools or relatively simple processes. This may include low-cost molds for one of the pans and using that pan as a mold for the other pan, be it a male mold forming the inner pan and then forming the outer pan thereon, or a female mold forming the outer pan and then forming the inner pan therein. The outer pan may be formed using various open-molding methods, including hand or spray lay-up techniques.

Oil pan improvements such as those noted above directly correlate to improved oil retention and oil pan durability along with lowered costs for manufacturing and tooling. This disclosure provides a composite engine oil pan and method for forming an oil pan for use in work vehicles that addresses these and other aspects relative to conventional arrangements and methods. The engine mounting assembly is capable of achieving the requisite load support and distribution characteristics while incorporating a desired oil pan, engine, drivetrain, and suspension system within a suitable form factor. The systems and components of the example agricultural combine provide the noted benefits along with requisite work performance in the field.

The following describes one or more example implementations of the disclosed layered composite engine oil pan and method of forming the composite engine oil pan. While discussion herein may sometimes focus on the example application of a composite engine oil pan in an agricultural combine, the disclosed composite engine oil pan may also be applicable to other types of work vehicle, including lower-capacity self-propelled or towed work vehicles, as well as various other agricultural machines (e.g., articulated tractors, utility tractors, and the like) and various construction and forestry machines (e.g., front end loaders, backhoes, excavators, forestry skidders and so on).

Figure 1:
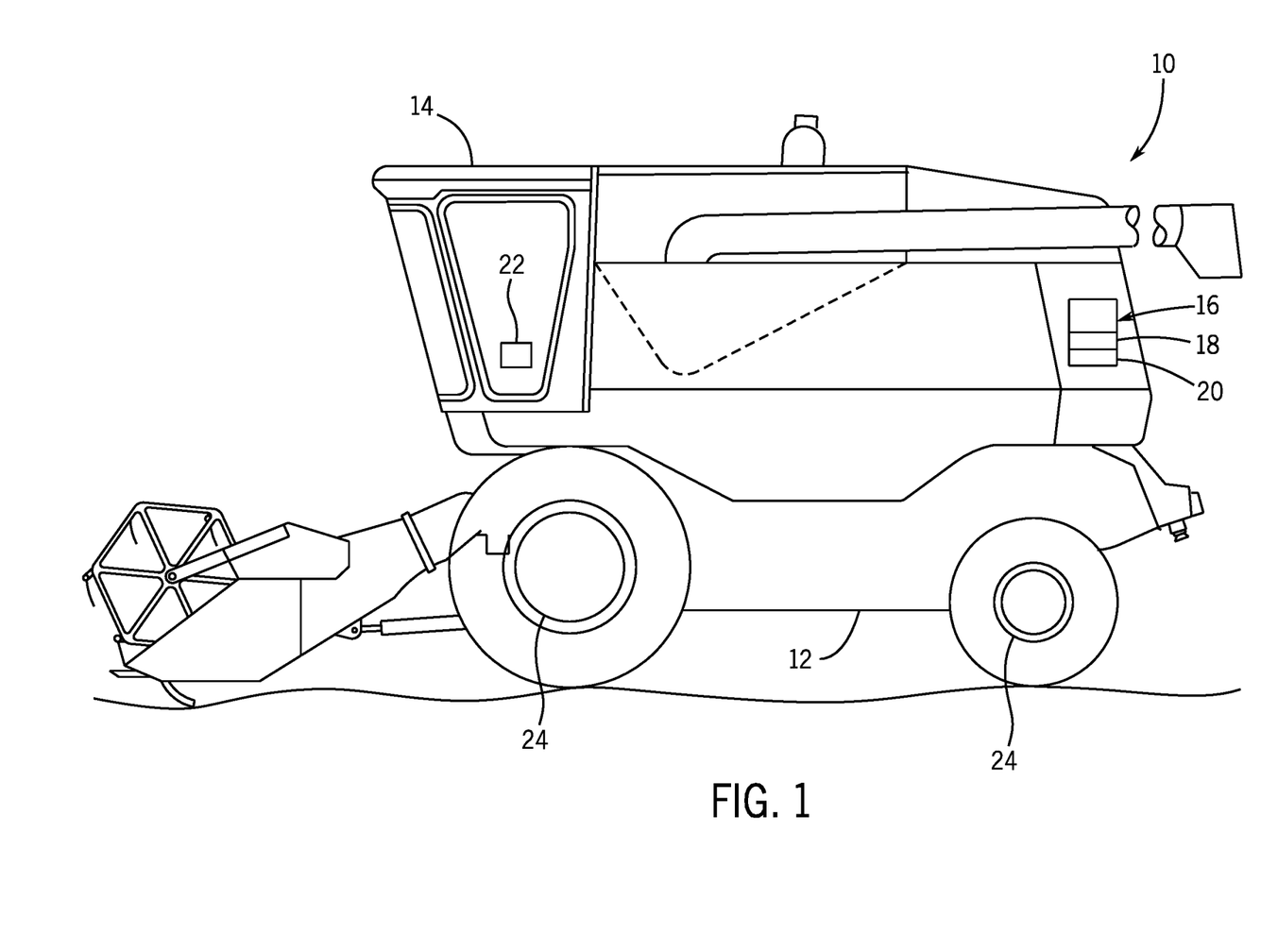
FIG. 1 is a side view of an example work vehicle in the form of an agricultural combine in which a composite engine oil pan may be used in accordance with this disclosure.

Example Embodiments of the Layered Composite Engine Oil Pan and Method of Making Referring to FIG. 1, in some embodiments, the disclosed work vehicle 10 may be an agricultural combine although the oil pan described herein may be applicable to a variety of machines. As shown, the work vehicle 10 may be considered to include a structural main frame or chassis 12, an operator cabin 14, an engine 16 having an engine block 18 and a composite engine oil pan 20, and a control system 22. The composite engine oil pan 20 is mounted to a bottom of the engine 16 (e.g., mounted below the engine block 18) to collect and retain engine oil that is subsequently filtered and recirculated through the engine 16. The chassis 12 is supported by ground-engaging wheels 24, at least the front wheels of which are steerable.

The engine 16 provides a source of power to propel the work vehicle 10 via the wheels 24, either directly as mechanical power (e.g., through a transmission) or upon being converted to electric or hydraulic power. In one example, the engine 16 is an internal combustion engine, such as a diesel engine, that is controlled by an engine control module (not shown) of a control system 22. As described in greater detail below, the engine 16 is partially formed by the engine block 18, which is a rigid immobile part for containing the cylinders, pistons, crankshaft, valves and other working components of the engine 16, and is an integrated component onto which these other working components of the engine 16 may be mounted. It should be noted that the use of an internal combustion engine is merely an example, as the source of propulsion may be a hybrid gas-electric motor, gasoline engine, or other power-producing device. In addition to providing tractive power to propel the work vehicle 10, the engine 16 may provide power to various onboard subsystems, including various electrical and hydraulic components of the work vehicle 10. As introduced above, the operator cabin 14 is supported on the chassis 12 and functions to house an operator (e.g., a human driver). As such, the operator cabin 14 may also house various types of operator interface and control mechanisms (e.g., various controls wheels, levers, switches, buttons, screens, keyboards, etc.).

As noted above, this disclosure provides an improved composite engine oil pan 20 has two discrete layers or pans of disparate materials. The inner layer or pan serves primarily to retain the liquid oil without leaking, and the outer layer or pan serves primarily to support and protect the inner layer or pan. To maintain low cost and weight, the inner layer or pan may be thin-walled, such as a metal sheet or film construction. The outer layer or pan may be relatively thicker, on the order of multiple integer values, than the inner layer or pan to provide structural support to carry the weight of the oil as well as to provide impact resistance. The outer layer or pan may be a single, homogenous material or itself may be a composite material with strength-reinforcing elements in embedded in a plastic resin or the like.

Figure 2:
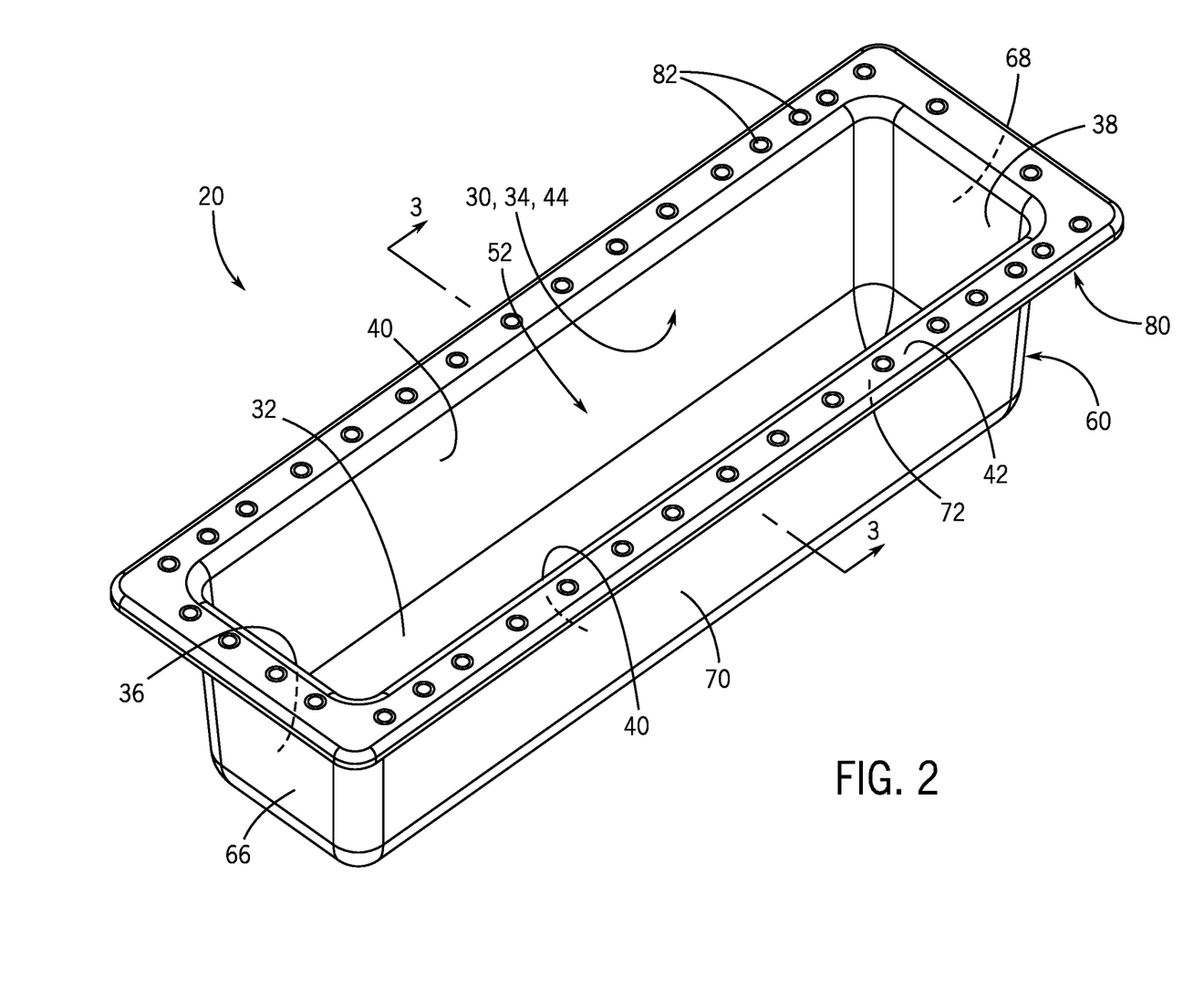
FIG. 2 is an isometric view of a composite engine oil pan of the example work vehicle of FIG. 1.
Figure 3:
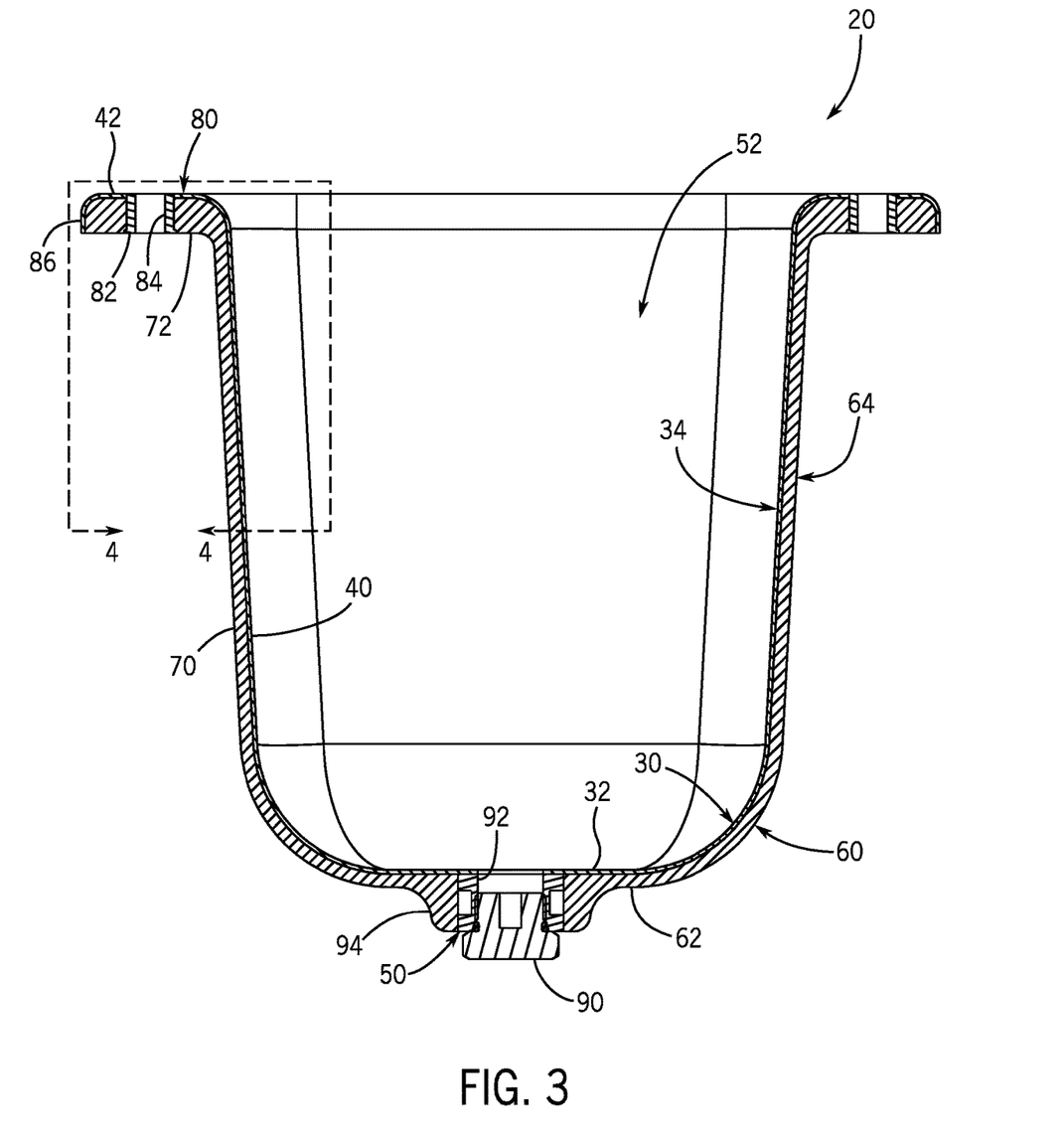
FIG. 3 is a cross-sectional view taken along the line 3-3 in FIG. 2.
Figure 4:
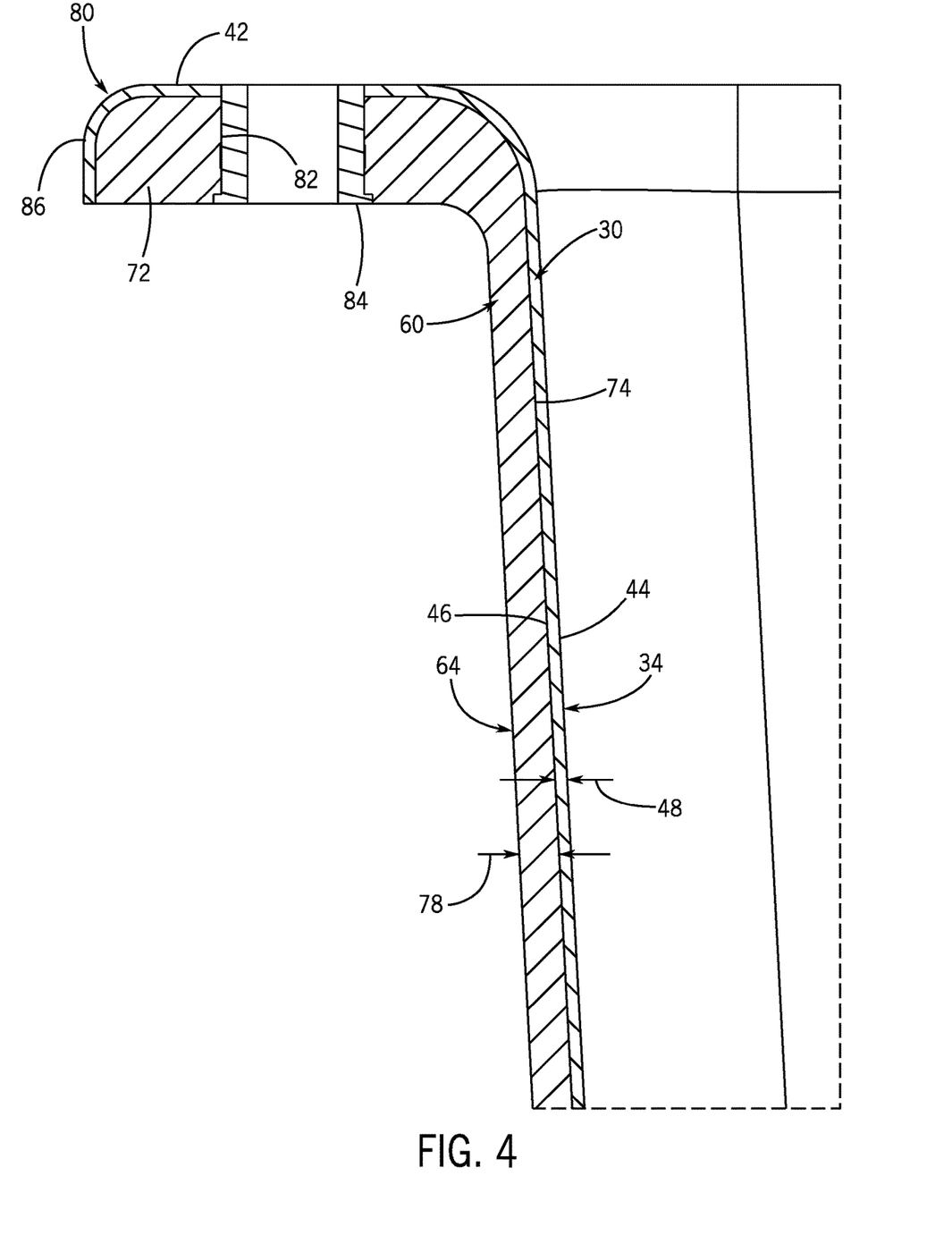
FIG. 4 is an enlarged partial cross-sectional view of section 4-4 in FIG. 3.

Referring also to FIGS. 2-4, in an illustrated example, the composite engine oil pan 20 includes a first pan 30 as an inner layer formed of a relatively thin sheet-like material, such as a thin wall metal, that is suitably malleable. In one example, the first pan 30 is a sheet of aluminum metal with a thickness of about 2 mm. In other examples, the first pan 30 may be an even thinner material such as a foil sheet. The first pan 30 has a first bottom wall 32 and a first plurality of peripheral walls 34 extending generally upward from the first bottom wall 32. The first plurality of peripheral walls 34 includes a first front wall 36, a first rear wall 38, and first side walls 40. One or more of the first plurality of peripheral walls 34 terminate in a first peripheral flange 42 extending outwardly from a top of the one or more of the first plurality of peripheral walls 34. The first pan 30 provides an inner surface 44 extending contiguously along the first bottom wall 32 and the first plurality of peripheral walls 34. An outer surface 46 of the first pan 30 is opposite the inner surface 44. The first pan 30 defines a first thickness 48 (see FIG. 4) that is generally consistent in the first bottom wall 32 and in the first plurality of peripheral walls 34. The inner surface 44 extends contiguously without interruption except for a drain opening 50 in the first bottom wall 34, such that the inner surface 44 of the first pan 30 is the only pan surface defining an oil sump 52 for retaining a volume of liquid oil.

The composite engine oil pan 20 also includes a second pan 60 as an outer layer formed of a relatively thicker polymeric material. The second pan 60 in this example is formed from a fiber-reinforced polymer (FRP) resin. The second pan 60 has a second bottom wall 62 and a second plurality of peripheral walls 64 extending generally upward from the first bottom wall 62. The second bottom wall 62 and the second plurality of peripheral walls 64 are in abutting relation, respectively, with the first bottom wall 32 and the first plurality of peripheral walls 34 of the first pan, such that the second pan 60 does not abut the inner surface 44 of the first pan 30. The second plurality of peripheral walls 64 includes a second front wall 66, a second rear wall 68, and second side walls 70. One or more of the second plurality of peripheral walls 64 terminate in a second peripheral flange 72 extending outwardly from a top of the one or more of the second plurality of peripheral walls 64. The second peripheral flange 72 is in abutting relationship with the first peripheral flange 42. The second pan 60 provides a second inner surface 74 extending contiguously along the second bottom wall 62 and the second plurality of peripheral walls 64 to abut with the outer surface 46 of the first pan. With this arrangement, the material of the second pan 60 may be oleophilic. Because the second pan 60 does not define the oil sump 52, the oleophilic material will not contact or absorb oil in use, and accordingly performance will not be diminished for either the composite engine oil pan 20 or the engine 16. The second pan 60 defines a second thickness 78 (see FIG. 4) that is generally consistent in the second bottom wall 62 and the second plurality of peripheral walls 64. The second thickness 78 is larger than the first thickness 48, for example by a factor of three or more as shown in FIG. 4. The second thickness 78 may be significantly greater than the first thickness 48, for example by a factor of ten or more, particularly if the first pan 30 is formed of a foil. Moreover, the second pan 60 is relatively more rigid and stiff while being less malleable compared to the first pan 30. It will be appreciated that the second peripheral flange 72 may have a greater thickness than the second thickness 78 of the other portions of the second pan 60, providing the second peripheral flange 72 with suitable strength and rigidity in mounting the composite engine oil pan 20 to the engine 16.

The first and second peripheral flanges 42, 72 constitute a mounting flange 80 for mounting the composite engine oil pan 20 to the engine 16. A plurality of bolt openings 82 are formed in the mounting flange 80 for receiving fasteners such as bolts (not shown) for fixing the mounting flange 80 to the engine block 18. A compression limiter 84 is installed in each of the plurality of bolt openings 82 and extend through both the first and second peripheral flanges 42, 72. The compression limiter 84 may be an annular shape (e.g., cylindrical or frusto-conical) and is formed of a material with a relatively greater compressive strength than the material of the second pan 60 so as to accommodate compression loads applied by the bolts and corresponding nuts (not shown). The first peripheral flange 42 defines an outer lip 86 at a distal end thereof extending downward toward the first bottom wall 32. The outer lip 86 forms the outer extent of the mounting flange 80 and aids in a molding process to form the second pan 60. The plurality of bolt openings 82 are illustrated in an evenly-spaced row about the mounting flange 80, but may have other arrangements that are not aligned in rows.

The drain opening 50 of the composite engine oil pan 20 extends through both the first bottom wall 32 and the second bottom wall 62. A drain plug 90 is removably mounted in the drain opening 50 to allow for draining the composite engine oil pan 20. In the illustrated example, the drain opening 50 has a drain insert 92 permanently affixed to the first and second bottom walls 32, 62 for positively receiving the drain plug 90. The drain insert 92 and the drain plug 90 have mating threads, although other mating and/or complementary structures may be implemented. The drain insert 92 is permanently affixed to the first bottom wall 32 of the first pan 30 to prevent any oil leakage, for example by welding, adhesive bonding, or the like. As shown in FIG. 3, the second bottom wall 62 of the second pan 60 may have a drain region 94 that is relatively thicker than the rest of the second pan 60 to provide structural reinforcement and to accommodate requisite threads for attachment of the drain plug 90. In other examples, the drain insert 92 may be omitted and instead the drain plug 90 may positively engage directly with the first and second bottom walls 32, 62 at the drain opening 50.

The composite engine oil pan 20 may be formed by various processes. In a first example process shown in FIG. 5, a sheet of metal 98 is formed into the first pan 30, including the first peripheral flange 42 and the outer lip 86, by pressing and/or stamping the sheet of metal against and around a mold 100. The mold 100 is a male mold in the desired shape of the oil sump 52, for example shaped as a rectangular prism with a flange extending therefrom in the desired shape of the first peripheral flange 42. The mold 100 may be formed of wood or various other rigid materials. Optionally, a non-stick coating may be applied to the mold 100 or one side of the sheet of metal to allow for easy removal after forming the first pan 30 on the mold 100. Once the sheet of metal 98 is pressed, the first pan 30 has the inner surface 44 oriented toward the mold 100 and defining the oil sump 52 and the outer surface 46 opposite the inner surface 44 oriented away from the mold 100. This pressing step includes forming the outer lip 86 of the first peripheral flange 42 that extends away from the oil sump 52. The mounting openings 82 are formed in the first peripheral flange 42 by drilling, punching, or the like. The drain opening 50 is similarly formed in the sheet of metal 98 at the bottom wall 32 by cutting, drilling, punching, or the like. In other examples, the drain opening 50 may be formed in the bottom wall 32 after the second pan 60 is molded or formed before the sheet of metal 98 is pressed against the mold 100. The first pan 30 remains on the mold 100 for forming the second pan 60, but in alternative examples the first pan 30 may be removed from the mold 100. The drain insert 92 is welded to the first pan 30 before the second pan 60 is formed and may be welded to the sheet of metal even before the sheet of metal is pressed against the mold 100.

Figure 5:
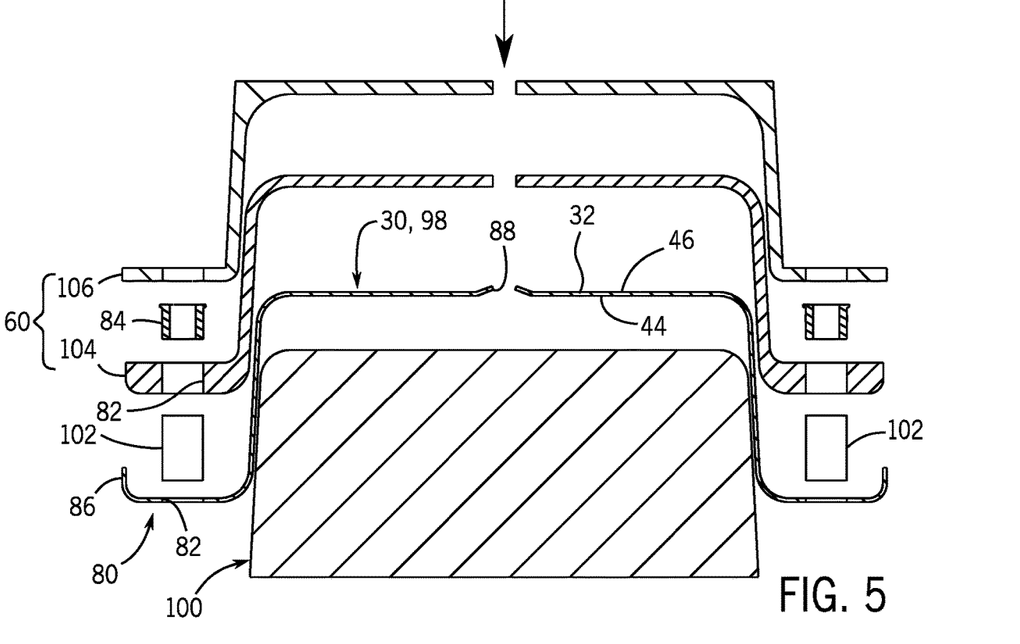
FIG. 5 is an exploded cross-sectional view of a first example process for forming the composite engine oil pan of FIG. 2.

Continuing the first example process, to prepare for open molding the second pan 60, the first example process includes providing guide pins 102 that extend from the first peripheral flange 42 of the first pan 30 at the bolt openings 82. The guide pins 102 are temporarily and removably mounted with a press fit, adhesive, and/or similar means. In a similar manner, a guide pin (not shown) may be temporarily and removably mounted in the drain opening 50 of the first pan 30 or in the drain insert 92. Subsequently, the second pan 60 is open molded onto the outer surface 46 of the first pan 30 while it remains on the mold 100, allowing the mold 100 to support the open molding steps. In particular, the second pan 60 is formed by applying an FRP 104 in an open molding process that includes applying a fluid polymeric resin onto the outer surface 46 of the first pan 30, placing a reinforcement fiber on the fluid polymeric resin, and pressing both the fluid polymeric resin and the reinforcement fiber against an outer surface of the first pan 30. The fluid polymeric resin and reinforcement fiber may be hand placed or may be sprayed with a spray gun, in what may be referred to as a hand lay-up or a spray lay-up technique. The second peripheral flange 72 and the drain region 94 of the second pan 60 are formed by the same molding process at the same time. If the drain insert 92 is installed before the second pan 60 is formed, the FRP 104 may be molded directly to the drain insert 92. In one example, the second pan 60 is formed directly onto the outer surface 46 of the first pan 30 without any intervening structure or bonding agent such that the open-molding step joins the second pan to the first pan. The compression limiters 84 are inserted into the bolt openings 82 in the mounting flange 80 through both the first peripheral flange 42 and the second peripheral flange 72. In certain examples, an additional FRP layer 106 is added to achieve a desired thickness at the second peripheral flange 72, the drain region 94, and/or other portions of the second pan 60. Finally, the composite engine oil pan 20 is removed from the mold 100 as a hybrid structure of two layers and the drain plug 90 is installed in the drain insert 92. Thus, in this example, the first pan 30 serves as a male mold onto which the second pan 60 may be formed.

Figure 6:
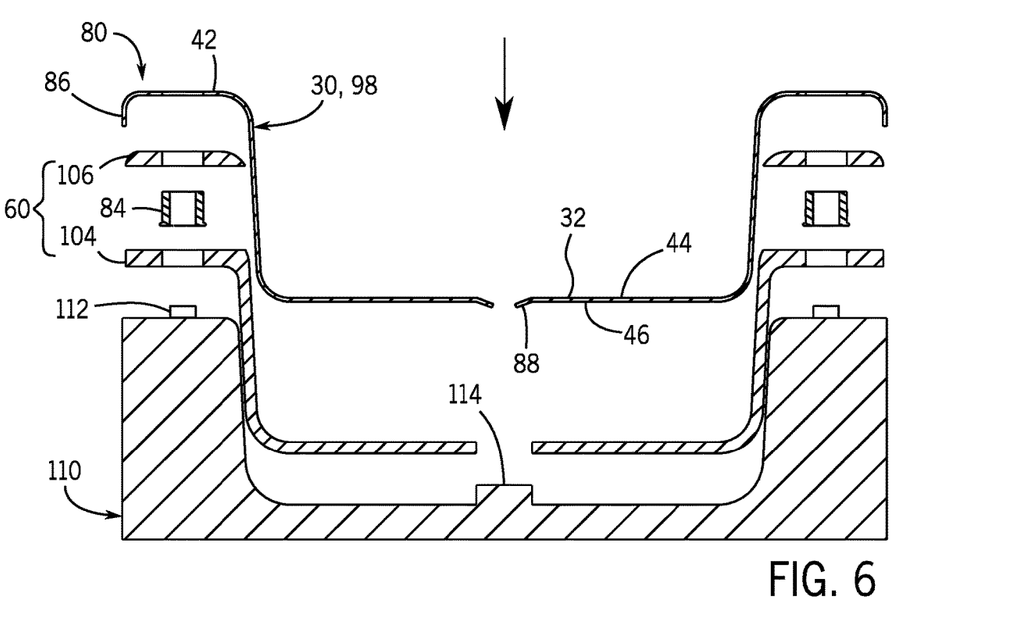
FIG. 6 is an exploded cross-sectional view of a second example process for forming the composite engine oil pan of FIG. 2.

In a second example process shown in FIG. 6, the process of forming the composite engine oil pan 20 is similar but in a generally reversed order from outer to inner parts. A mold 110 is provided for the second example process that is a female mold in the desired shape of the exterior of the second pan 60 including the second peripheral flange 72 with guide pins 112 that extend from the mold 110 in the locations of the bolt openings 82. The guide pins 112 may be formed unitary with the mold 110 or may be a separate structure that is permanently or removably mounted to the mold 110. In a similar manner, a guide pin 114 is permanently or temporarily mounted to the mold 110 at the location of the drain opening 50. The mold 110 may also be coated with a non-stick treatment to aid in eventual removal of the composite engine oil pan 20. The second pan 60 is formed by applying an FRP 104 in an open molding process into the mold 110 including forming the first peripheral flange 72. In particular, the open molding process includes applying a fluid polymeric resin onto the mold 110, placing a reinforcement fiber on the fluid polymeric resin, and pressing both the fluid polymeric resin and the reinforcement fiber against the mold 110. The fluid polymeric resin and reinforcement fiber may be hand placed or may be sprayed with a spray gun (i.e., a hand lay-up or a spray lay-up technique). This open molding process is substantially similar to the open molding of the first example process. In certain examples, an additional FRP layer 106 is added for the second peripheral flange 72 to attain the desired thickness.

Continuing the second example process, the sheet of metal is formed into the first pan 30, including the first peripheral flange 42 and the outer lip 86, by pressing the sheet of metal 98 against and into the inner surface 44 of the second pan 60. In this manner, the first pan 30 has the outer surface 46 mounted to the inner surface 44 of the second pan 60, and the inner surface 44 of the first pan 30 defines the oil sump 52. The drain opening 50 is formed in the first pan 30 including a drain rim 88 extending away from the oil sump 52. The drain opening 50 and the bolt openings 82 of the first pan 30 may be formed while the sheet of metal 98 is pressed into the inner surface of the second pan 60 or after this step. The bolt openings 82 are formed in the first peripheral flange 42 of the first pan 30 around the compression limiters 84. Any extra material at the bolt openings 82 is removed at this stage or subsequent stages by cutting, drilling, punching, or the like. The drain insert 92 (FIG. 3) is permanently mounted (e.g., welded) to the sheet of metal 98 before it is pressed into the second pan 60 or may be installed after the sheet of metal 98 is pressed and after the composite engine oil pan 20 is removed from the mold 110. Subsequently, the compression limiters 84 are inserted into the bolt openings 82 in the mounting flange 80 through both the first pan 30 and the second pan 60. Finally, the composite engine oil pan 20 is removed from the mold 100 as a hybrid structure of two layers and the drain plug 90 is installed in the drain insert 92. Thus, in this example, the second pan 60 serves as a female mold into which the first pan 30 may be formed.

A variety of materials are applicable to forming the fiber-reinforced polymer (FRP 104 and additional FRP layer 106) of the second pan 60, including various resins and fibers. Due to the particular arrangement of the first pan 30 for containing oil (e.g., contiguous shape forming the oil sump 52 with the second pan 60 not abutting the inner surface 44 of the first pan, etc.), the requisite material properties of the selected FRP are tailored toward other metrics separate from containing oil. For example, the material of the second pan 60 may be selected to provide suitable strength, rigidity, vibration dampening, other mechanical properties and the like. The material may be oleophilic (i.e., readily absorbs oils). In particular, the FRP of the second pan 60 may be nylon, a sheet molding compound (SMC), Bulk Molding Compound (BMC), or the like. In some examples, the FRP is a SMC with glass reinforcement of between 10% and 60% by weight with a glass length between 0.50 inch to 1.00 in. along with randomly oriented fibers in up to 35% by weight. In other examples, the FRP is a BMC formed as a thermoset plastic resin blend of various inert fillers, fiber reinforcement, catalysts, stabilizers, and pigments. BMC is highly filled and reinforced with short fibers. Glass reinforcement of the BMC represents between 10% and 30% by weight, with glass length typically between 0.03 in. 0.50 in. BMC composites include unsaturated polyester or epoxy vinyl ester materials.

The composite engine oil pan 20 may include several features to provide the requisite structural strength and/or to improve the fit within the work vehicle 10. The first and second bottom walls 32, 62 and the first and second plurality of peripheral walls 34, 64 of the composite engine oil pan 20 may be provided with ribs to provide supplemental strength. Moreover, first and second bottom walls 32, 62 and the first and second plurality of peripheral walls 34, 64 are sized and shaped to fit with the engine block 18 and within the work vehicle 10, and as such may include various indents or other features. The composite engine oil pan 20 spans, at least in part, across the width and length of the engine block 18. In this manner the composite engine oil pan 20 is configured to conform, at least in part, to the engine block 18. As best shown in FIG. 3, the drain plug 90 of the composite engine oil pan 20 is readily removable (e.g., by threading) for draining the oil pan 20. The various walls of the composite engine oil pan 20 are illustrated as substantially vertical, although in alternative examples one or more of the first and second plurality of peripheral walls 34, 64 may be angled or curved while still defining the oil sump 52.

Moreover, the mounting flange 80 may be shaped and configured to closely fit with various corresponding surfaces of the engine block 18 and the chassis 12. As illustrated in FIG. 2, the example mounting flange 80 is substantially planar with the plurality of bolt openings 82 positioned along the same plane. The planar shape of the mounting flange 80 faces and engages a corresponding planar face of the engine block 18. Additionally, the mounting flange 80 may be provided with or without a gasket (not shown) between the composite engine oil pan 20 and the engine block 18.

The foregoing describes one or more example layered composite engine oil pans and methods of forming the oil pans in detail. Various other configurations are possible within the scope of this disclosure. In particular, the mounting holes and drain hole in the first and second pan may be formed by various means such as removal of material after the composite engine oil pan is formed. Likewise, the guide pins could be substituted for other methods of bolt openings in the second pan, such as drilling after forming the second peripheral flange. The compression inserts and drain insert may be installed at various times during production. Also, other molding techniques may be employed, such as vacuum bagging or vacuum infusion techniques. The former process uses a vacuum bag to withdraw excess resin during molding. The latter process draws a vacuum in the mold while the materials are dry, after which an optimal amount of resin is infused under vacuum pressure. Both processes may uniformly distribute the resin and enhance the fiber-to-resin ratio of the structure to provide a stronger, lighter product.

Aspects of the disclosed examples provide improvements in oil retention with suitable strength and performance for heavy-duty work vehicle environments. The method of forming the composite engine oil pan is advantageous for small production runs and low-cost materials, and does not require a dedicated assembly line or significant tooling preparation. The method may be readily adapted to different non-structural vehicle applications by simply redesigning the mold.

ENUMERATED EXAMPLES

Also, the following examples are provided, which are numbered for easier reference.

1. A method of forming a composite oil pan for an engine of a work vehicle. In various embodiments, the method comprises: forming a sheet of metal into a first pan, the first pan having a first bottom wall and first peripheral walls extending from edges of the first bottom wall to define a sump for containing engine oil, the first peripheral walls terminating in a first peripheral flange extending outwardly; and open-molding a fiber-reinforced polymer resin onto the first pan to form a second pan having a second bottom wall in abutting relation with the first bottom wall and having second peripheral walls extending from edges of the second bottom wall and in abutting relation with the first peripheral walls, the second peripheral walls terminating in a second peripheral flange in abutting relation with the first peripheral flange; wherein the first pan defines a thin wall metal structure with an inner surface extending across the first bottom wall, the first peripheral walls and the peripheral first flange, and wherein the second pan reinforces the first pan without abutting the inner surface.

2. The method of example 1, wherein the fiber-reinforced polymer resin is oleophilic.

3. The method of example 1, wherein the open-molding step is a hand lay-up process including the steps of: applying a fluid polymeric resin onto the first pan; placing a reinforcement fiber on the fluid polymeric resin; and pressing both the fluid polymeric resin and the reinforcement fiber against an outer surface of the first pan.

4. The method of example 1, wherein the open-molding step is a spray lay-up process including the steps of: spraying, using a spray gun, a fluid polymeric resin onto the first pan; spraying, using the spray gun, a reinforcement fiber on the fluid polymeric resin; and pressing both the fluid polymeric resin and the reinforcement fiber against an outer surface of the first pan.

5. The method of example 1, wherein the second pan is thicker than the first pan by a factor of three or more.

6. The method of example 1, wherein the thin wall metal structure of the first pan has an outer surface opposite the inner surface, wherein the second pan abuts the outer surface.

7. The method of example 1, wherein the inner surface of the first pan defines a contiguous oil sump with a drain opening in the first bottom wall.

8. The method of example 1, further comprising: adding, after the forming step, a plurality of openings to the first and second peripheral flanges.

9. The method of example 8, further comprising: installing, after the adding step, a compression limiter in one or more of the plurality of openings in the first and second peripheral flanges, the compression limiter extending through both the first and second peripheral flanges.

10. The method of example 9, wherein the compression limiter is a flanged annulus with a relatively greater compressive strength than the fiber-reinforced polymer resin.

11. The method of example 8, wherein the first pan further comprises a plurality of ribs in the first peripheral walls of the first pan, the plurality of ribs provided in an alternating arrangement with the plurality of openings.

12. The method of example 1, wherein the step of forming the sheet of metal includes forming an outer lip at a distal end of the first peripheral flange, the outer lip extending downward toward the first bottom wall of the first pan.

13. The method of example 1, wherein the second pan is formed directly onto an outer surface of the first pan without any intervening structure or bonding agent such that the open-molding step joins the second pan to the first pan.

14. The method of example 1, wherein the forming step includes pressing the sheet of metal against a mold; the method further comprising removing the composite engine oil pan from the mold after the open-molding step.

15. In further embodiments, a composite engine oil pan is provided. The composite engine oil pan includes a first pan formed of a sheet of metal with a first bottom wall and a first plurality of peripheral walls extending generally upwardly from the first bottom wall, the first plurality of peripheral walls including a first front wall, a first rear wall, and first side walls, the first plurality of peripheral walls terminating in a first peripheral flange extending outwardly from a top of one or more of the first front wall, the first rear wall, and the first side walls, the first pan including: an oil sump for containing oil defined by an inner surface extending contiguously along the first bottom wall and the first plurality of peripheral walls and an outer surface opposite the inner surface; and a second pan formed of a fiber-reinforced polymer resin with a second bottom wall and a second plurality of peripheral walls extending generally upwardly from the second bottom wall, the second plurality of peripheral walls including a second front wall, a second rear wall, and second side walls, the second plurality of peripheral walls terminating in a second peripheral flange extending outwardly from a top of one or more of the second front wall, the second rear wall, and the second side walls, the second pan abutting and bonded to the outer surface of the first pan; wherein the second pan is mounted to cover, at least in part, the outer surface of the first pan; and wherein the second pan is thicker than the first pan to structurally reinforce the first pan without abutting the inner surface of the first pan.

CONCLUSION

The examples discussed above result in a variety of benefits of the disclosed layered composite engine oil pan and method of forming the composite engine oil pan. For example, the composite engine oil pan is suitably strong for the extreme conditions and long run times of heavy-duty work vehicles while being manufactured in a relatively low-cost manner. Further, oleophilic materials may be used for the FRP second pan due to the contiguous arrangement of the first pan.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A method of forming a composite oil pan for an engine of a work vehicle, the method comprising:
    forming a sheet of metal into a first pan, the first pan having a first bottom wall and first peripheral walls extending from edges of the first bottom wall to define a sump for containing engine oil, the first peripheral walls terminating in a first peripheral flange extending outwardly; and
    open-molding a fiber-reinforced polymer resin onto the first pan to form a second pan having a second bottom wall in abutting relation with the first bottom wall and having second peripheral walls extending from edges of the second bottom wall and in abutting relation with the first peripheral walls, the second peripheral walls terminating in a second peripheral flange in abutting relation with the first peripheral flange;
    wherein the first pan defines a thin wall metal structure in which the second pan is thicker than the first pan by a factor of three or more, the first pan having an inner surface extending across the first bottom wall, the first peripheral walls and the peripheral first flange, and wherein the second pan structurally reinforces the first pan without abutting the inner surface.

2. The method of claim 1, wherein the fiber-reinforced polymer resin is oleophilic.

3. The method of claim 1, wherein the open-molding step is a hand lay-up process including the steps of:
    applying a fluid polymeric resin onto the first pan;
    placing a reinforcement fiber on the fluid polymeric resin; and
    pressing both the fluid polymeric resin and the reinforcement fiber against an outer surface of the first pan.

4. The method of claim 1, wherein the open-molding step is a spray lay-up process including the steps of:
    spraying, using a spray gun, a fluid polymeric resin onto the first pan;
    spraying, using the spray gun, a reinforcement fiber on the fluid polymeric resin; and
    pressing both the fluid polymeric resin and the reinforcement fiber against an outer surface of the first pan.

5. The method of claim 1, wherein the thin wall metal structure of the first pan has an outer surface opposite the inner surface, wherein the second pan abuts the outer surface.

6. The method of claim 1, wherein the inner surface of the first pan defines a contiguous oil sump with a drain opening in the first bottom wall.

7. The method of claim 1, further comprising:
    adding, after the forming step, a plurality of openings to the first and second peripheral flanges.

8. The method of claim 7, further comprising:
    installing, after the adding step, a compression limiter in one or more of the plurality of openings in the first and second peripheral flanges, the compression limiter extending through both the first and second peripheral flanges.

9. The method of claim 8, wherein the compression limiter is a flanged annulus with a relatively greater compressive strength than the fiber-reinforced polymer resin.

10. The method of claim 1, wherein the step of forming the sheet of metal includes forming an outer lip at a distal end of the first peripheral flange, the outer lip extending downward toward the first bottom wall of the first pan.

11. The method of claim 1, wherein the second pan is formed directly onto an outer surface of the first pan without any intervening structure or bonding agent such that the open-molding step joins the second pan to the first pan.

12. The method of claim 1, wherein the forming step includes pressing the sheet of metal against a mold; the method further comprising removing the composite oil pan from the mold after the open-molding step.

13. A composite engine oil pan, comprising:
    a first pan formed of a sheet of metal with a first bottom wall and a first plurality of peripheral walls extending generally upwardly from the first bottom wall, the first plurality of peripheral walls including a first front wall, a first rear wall, and first side walls, the first plurality of peripheral walls terminating in a first peripheral flange extending outwardly from a top of one or more of the first front wall, the first rear wall, and the first side walls, the first pan including: an oil sump for containing oil defined by an inner surface extending contiguously along the first bottom wall and the first plurality of peripheral walls and an outer surface opposite the inner surface; and
    a second pan formed of a fiber-reinforced polymer resin with a second bottom wall and a second plurality of peripheral walls extending generally upwardly from the second bottom wall, the second plurality of peripheral walls including a second front wall, a second rear wall, and second side walls, the second plurality of peripheral walls terminating in a second peripheral flange extending outwardly from a top of one or more of the second front wall, the second rear wall, and the second side walls, the second pan abutting and bonded to the outer surface of the first pan;
    wherein the second pan is mounted to cover, at least in part, the outer surface of the first pan;
    wherein the second pan is thicker than the first pan by a factor of three or more to structurally reinforce the first pan without abutting the inner surface of the first pan;
    wherein the sheet of metal is press-formed about a mold; and
    wherein the second pan is open-molded directly onto the outer surface of the first pan at the first bottom wall and first peripheral walls and along an underside of the first peripheral flange.

14. The composite engine oil pan of claim 13, wherein the fiber-reinforced polymer resin is oleophilic.

15. The composite engine oil pan of claim 13, further comprising:
    one or more compression limiters extending through both the first and second peripheral flanges for mounting the composite engine oil pan, the one or more compression limiters having a relatively greater compressive strength than the fiber-reinforced polymer resin.

16. The method of claim 1, wherein the first pan is a foil sheet construction.

17. The composite engine oil pan of claim 13, wherein the first pan is a foil sheet construction.

\* \* \* \* \*